(12) United States Patent
Ristow et al.

(10) Patent No.: US 8,271,407 B2
(45) Date of Patent: Sep. 18, 2012

(54) METHOD AND MONITORING SYSTEM FOR THE RULE-BASED MONITORING OF A SERVICE-ORIENTED ARCHITECTURE

(75) Inventors: Gerald Ristow, Griesheim (DE); Joachim Voegele, Riedstadt (DE)

(73) Assignee: Software AG, Darmstadt (DE)

( * ) Notice: Subject to any disclaimer, the term of this patent is extended or adjusted under 35 U.S.C. 154(b) by 397 days.

(21) Appl. No.: 12/588,174

(22) Filed: Oct. 6, 2009

(65) Prior Publication Data

US 2010/0088256 A1  Apr. 8, 2010

(30) Foreign Application Priority Data

Oct. 6, 2008 (EP) ..................................... 08017502

(51) Int. Cl.
*G06F 15/18* (2006.01)
(52) U.S. Cl. ......................................................... 706/12
(58) Field of Classification Search .................. None
See application file for complete search history.

(56) References Cited

U.S. PATENT DOCUMENTS

| | | | |
|---|---|---|---|
| 5,317,677 A | 5/1994 | Dolan et al. | |
| 2005/0262194 A1* | 11/2005 | Mamou et al. ................ | 709/203 |
| 2006/0031481 A1 | 2/2006 | Patrick et al. | |
| 2007/0143474 A1* | 6/2007 | Sheng et al. ................. | 709/224 |
| 2007/0239819 A1* | 10/2007 | Woods et al. ................. | 709/201 |
| 2008/0144710 A1* | 6/2008 | Becker et al. ................. | 375/240 |

FOREIGN PATENT DOCUMENTS

EP  1 863 258  12/2007

OTHER PUBLICATIONS

'A model for CBR systems that adapt to rapidly changing context': Decker, 2006, ceur-ws.org.*
'Semantic web services monitoring: An OWL-S based approach': Vaculin, 2008, IEEE, 1530-1605.*
"Discovery of Interesting Association Rules from Livelink Web Log Data" Huang et al., Data Mining 2002 Proceedings 2002 IEEE Conference, Japan, Dec. 12, 2002.
"A Rule Based Data Monitoring Middleware for Mobile Applications", Gehlen et al., Vehicular Technology Conference 2005 VTC, 2005 IEEE 61$^{st}$ IEEE, New Jersey, vol. 5, pp. 2910-2914.
"Semantic Web Services Monitoring: An OWL-S based Approach", Vaculin et al., 2008 Hawaii International Conference on System Sciences, Proceedings of the 41$^{st}$ annual, IEEE, New Jersey.

* cited by examiner

*Primary Examiner* — Omar Fernandez Rivas
*Assistant Examiner* — Peter Coughlan
(74) *Attorney, Agent, or Firm* — Nixon & Vanderhye PC

(57) ABSTRACT

The present invention concerns a method for the rule-based monitoring of a component (C1) added to a service-oriented architecture (SOA), the SOA comprising a plurality of components (C2, . . . , Cn) being monitored by a plurality of monitoring components (M2, . . . , Mn), the method comprising the following steps:
a. selecting a component (C2) from the plurality of components (C2, . . . , Cn) of the SOA which is similar to the added component (C1) based on a similarity-metric;
b. selecting at least one rule (R2) from the monitoring component (M2) of the selected component (C2), wherein the at least one rule (R2) has already been validated during the operation of the SOA; and
c. adding the at least one rule (R2) to a new monitoring component (M1) of the added component (C1).

20 Claims, 2 Drawing Sheets

Figure 1:
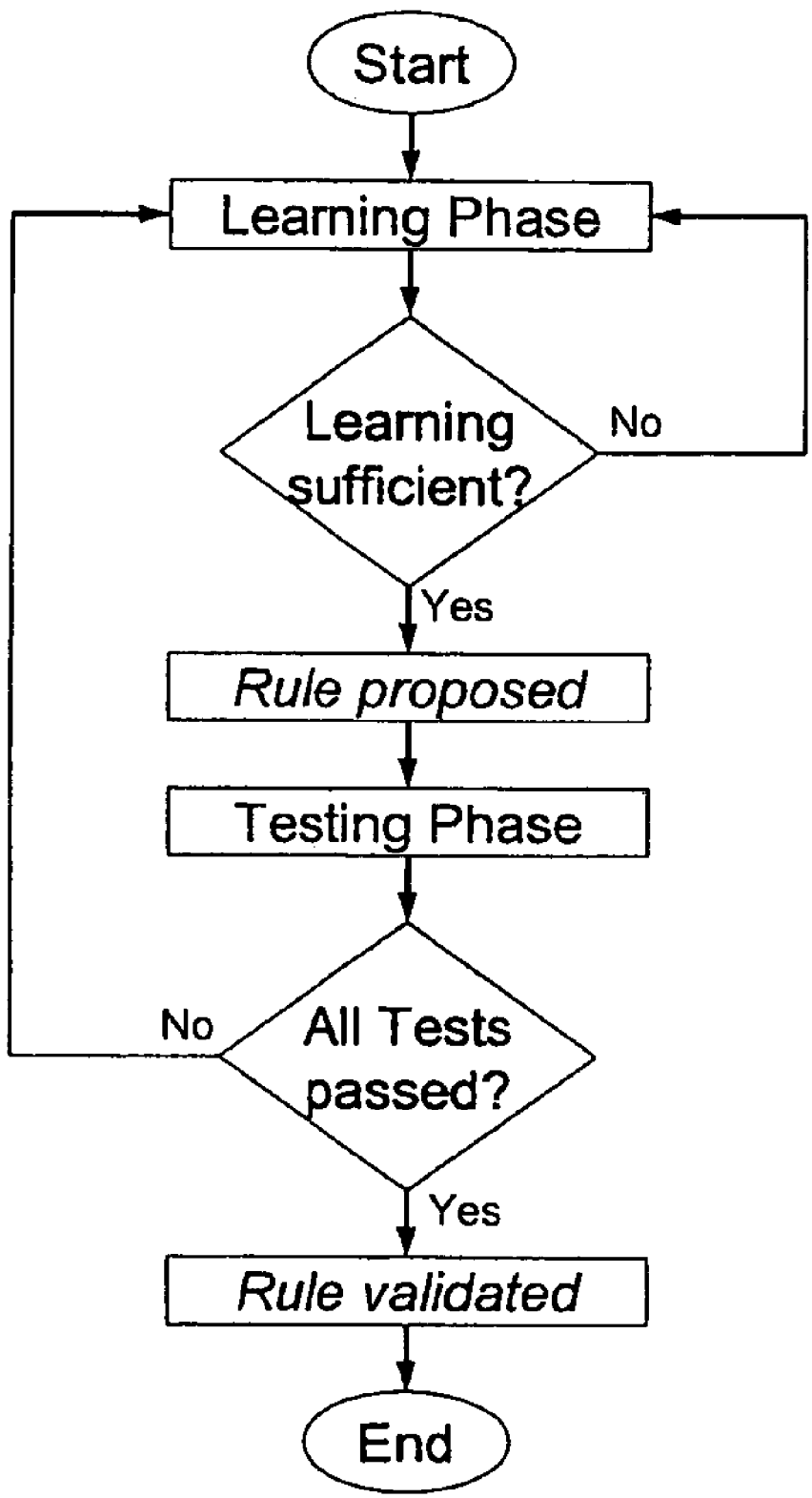

METHOD AND MONITORING SYSTEM FOR THE RULE-BASED MONITORING OF A SERVICE-ORIENTED ARCHITECTURE

This application claims priority to European Application No. 08017502.9, filed 6 Oct. 2008, the entire contents of which are hereby incorporated by reference.

1. TECHNICAL FIELD

The present invention relates to a method and a monitoring system for the rule-based monitoring of a service-oriented architecture.

2. THE PRIOR ART

In a service-oriented architecture (SOA), resources are made available to participants in the network as independent services that the participants can access in a standardized way. Whereas most definitions of a SOA use SOAP requests conveyed via HTTP/HTTPS over TCP/IP, a SOA may use any service-based technology. The services interoperate based on formal definitions which are independent from the underlying platform and programming language. The interface definition encapsulates the specific implementations. A SOA is independent of a specific development technology (such as Java and .NET). The software components become very reusable because the interface is standards-compliant and is independent from the underlying implementation of the (web) service logic. For example, a C# (C Sharp) service could be used by a Java application and vice versa.

Monitoring a SOA is an important and difficult technical task in order to assure that the SOA operates as desired. This applies not only to the development stage of the SOA, when the source codes of the various SOA components repeatedly need to be debugged but also to the deployment and testing phases, for example when exceptional runtime situations must be controlled or the performance of the SOA is to be evaluated for maintenance or other purposes.

Traditionally, monitoring a software system comprises generating one or more log files according to a set of fixed and predetermined rules of the monitoring system, which allow for understanding the sequence of events as they occurred in the software system. This concept is problematic for application in a SOA, since it only provides a limited amount of flexibility which is in contrast to the flexible nature of a SOA. Furthermore, log files are not applicable to discover complex error situations in advance. On the contrary, log files only allow discovering the reason for a problem after the problem occurred. Consequently, they do not enable taking any counter measures in due time to prevent the problem.

Since a SOA landscape usually consists of many components that can interact with each other in a complex way and that may dynamically change over time, keeping track of all configurations and the changes thereof is a non-trivial task. It is therefore known in the prior art to provide a centralized registry/repository for a SOA, such as the products "Infravio" or "CentraSite" of applicant, which can simplify and facilitate this task. However, documenting the SOA landscape does not ensure a smooth and error-free operation. In the EP 1 863 258 applicant already described a system and method for managing web services and how runtime information of the SOA can be gathered and stored in this registry. Whereas the disclosed method and system already substantially facilitates the management of the complex SOA landscape, it is not capable to automatically analyze complex situation.

Further monitoring systems known in the prior art are bound to application servers and mostly supervise only web services. An example can be found in the US 2006/0031481 A1, which discloses the monitoring of a plurality of service proxies by collecting and aggregating data and triggering events according to rules predefined by a user. Another example for a modeling tool for composite e-services and functionality, which allows monitoring the status of service execution, can be found in the U.S. Pat. No. 7,222,334 B2.

In order to increase the reliability of the rules of a monitoring system, it is known from the prior art to use self-learning and rule-based monitoring processes as e.g. depicted in FIG. 1. To this end, a rule is first obtained in a learning phase, preferably in a learning loop, which results in a proposed rule for the SOA component to be monitored. The proposed rule may then be validated through a testing phase comprising any number of tests, which may be performed in a loop until the proposed rule passes all tests. Once all tests are passed, the proposed rule may be automatically marked as validated.

However, the above described learning/testing process may be inefficient and time-consuming, since the whole learning/testing process typically has to be undergone numerous times in the life-cycle of a SOA. For example when new components are to be added to the SOA landscape, they cannot be monitored right away, since the corresponding monitoring components each have to undergo the full learning/testing process in order to obtain the monitoring-rules. This makes the SOA either inflexible and inefficient (in case the new components are not used before validated rules have been "learned") or, more importantly, may impose a severe security-risk (in case the new components are already used although the rules are not yet validated).

In view of the above, it is therefore the technical problem of the present invention to improve the rule-based monitoring of a service-oriented architecture (SOA), thereby at least partly overcoming the disadvantages of the prior art.

3. SUMMARY OF THE INVENTION

This problem is in one aspect solved by a method for the rule-based monitoring of a component added to a service-oriented architecture (SOA), the SOA comprising a plurality of components being monitored by a plurality of monitoring components. In the embodiment of claim 1, the method comprises the following steps:

a. selecting a component from the plurality of components of the SOA which is similar to the added component based on a similarity-metric;
b. selecting at least one rule from the monitoring component of the selected component, wherein the at least one rule has already been validated during the operation of the SOA; and
c. adding the at least one rule to a new monitoring component of the added component.

Accordingly, when adding a new component to a SOA, a similar existing component of the SOA is identified through a similarity-metric. If the identified component, i.e. its monitoring component, has rules which have already been validated in the operation of the SOA, these rules may be added to the monitoring component of the new component. The invention greatly simplifies the monitoring of a SOA when adding a new component by reusing already validated rules of similar monitoring components.

In one aspect of the invention, the similarity-metric may calculate a similarity-value indicating the similarity of the added component with the plurality of components of the SOA and the component with the highest similarity-value may be selected. Additionally or alternatively, the component may only be selected in step a. if the similarity-value is greater or equal to a pre-defined value. This ensures that only rules from sufficiently similar components are reused.

In another aspect, the similarity-metric may categorize the components into groups such as service, application server and/or computer hardware. Such a categorization serves to ensure that only components of similar type are compared by the similarity-metric.

If the components are services, the similarity-value may be calculated based on any of the group of information comprising the number and/or the names of methods provided by the services, their input parameter types and/or their output parameter types. Alternatively, if the components are application servers, the similarity-value may be calculated based on any of the group of information comprising their product types, product versions, used software and/or used hardware. Lastly, if the components are computer hardware, the similarity-value may be calculated based on any of the group of information comprising their operating systems, operating system versions and/or hardware configurations.

The existing monitoring component may have undergone a learning-phase to obtain the at least one rule. Furthermore, the selected monitoring component may have undergone a testing-phase to validate the at least one rule during the operation of the SOA. Accordingly, with the present method, rules can be obtained for new components to be monitored without having to go through the full learning-phase of the respective monitoring component if a similar component is already present in the monitored landscape which has already undergone a quality approved learning-phase.

The method may further comprise the step of providing the new monitoring component and the at least one added rule to a testing-phase to validate the at least one rule during the operation of the SOA. This ensures that the newly added rules are tested and validated in the context of the added component. Additionally or alternatively, the method may further comprise the step of providing the new monitoring component and the at least one added rule to a learning-phase to determine at least one parameter of the at least one rule.

The present invention also relates to a monitoring system for the rule-based monitoring of a component added to a service-oriented architecture (SOA), the SOA comprising a plurality of components being monitored by a plurality of monitoring components, the monitoring system being adapted for performing any of the described methods. Furthermore, a computer program is provided comprising instructions for implementing any of the described methods.

4. SHORT DESCRIPTION OF THE DRAWINGS

In the following detailed description presently preferred embodiments of the invention are further described with reference to the following figures:

FIG. 1: A schematic overview of a learning/testing process according to the prior art; and FIG. 2: A schematic overview of an embodiment of the present invention;

4. DETAILED DESCRIPTION

In the following, an exemplary embodiment of the monitoring method and system of the present invention will be described. The embodiment of the invention comprises a system and a method for a monitoring process which simplifies the obtaining of reliable rules for new components added to a SOA landscape by reusing existing validated rules of similar components of the SOA.

A SOA landscape typically comprises many components that can interact with each other in a complex way. Such components of a SOA can be of very different origin comprising objects such as services, especially web services, applications, clients, hardware and software components, and many more.

Figure 2:
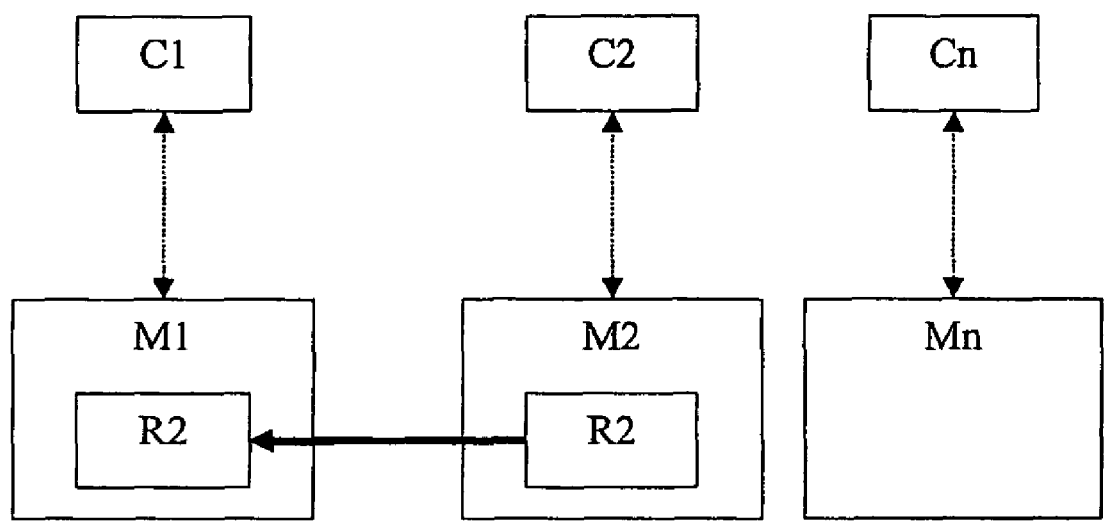

In order to monitor the components of a SOA, it is known to represent each of the components by a monitoring component which collects runtime data during the operation of the SOA. In this context, FIG. 2 presents an overview of an extremely simplified SOA landscape, which comprises a plurality of components $C2, \ldots, Cn$, which are accompanied by monitoring components $M2, \ldots, Mn$. In the depicted example, each of the monitoring components $M2, \ldots, Mn$ monitors one corresponding component $C2, \ldots, Cn$ of the SOA. However, it is also possible to have one monitoring component for monitoring more than one of the components of the SOA. It is further possible to monitor only some of the components of the SOA.

The data collected by the monitoring components $M2, \ldots, Mn$ may comprise actually measured values of the bandwidth, the message length of the messages issued by the components of the SOA, the number of messages per time, the duration or any other suitable value related to an operation of the components of the SOA. If the monitored component is e.g. a hardware component of the SOA, different values which are specific to this component may be monitored.

Combining the collected runtime data obtained by the monitoring components will provide an overall picture on how well the SOA landscape is operating. In order to filter the collected runtime data, i.e. to exclude irrelevant information, monitoring-rules may be attached to the monitoring components, so that the monitoring components only collect the relevant data from the components of the SOA landscape. As can be seen in FIG. 2, the monitoring component M2 has one or more monitoring-rules R2 attached. Furthermore, such monitoring-rules may also define what to do with the collected information, i.e. writing it to a log-file or issuing warning messages and/or alerts if certain boundaries are exceeded.

Monitoring-rules may be statically pre-defined e.g. by experienced administration personnel of the SOA. However, this is inflexible with respect to changes of the components of the SOA, since new rules would have to be formulated manually, which is time-consuming and error-prone. To this end, it is known to provide a self-learning monitoring process as depicted in FIG. 1. First, in a learning phase, a certain starting rule is incrementally refined, e.g. based on statistical values, until a proposed rule is obtained. This proposed rule is subsequently tested in a testing phase comprising any number of tests. When the proposed rule has passed all tests, it may be automatically or manually set to "validated" and used for the monitoring of the SOA. It should be appreciated that the learning of monitoring-rules could be accomplished in a test-run of the SOA as well as during its operational performance.

When a new component C1 (see FIG. 2) is to be added to the SOA, normally the whole learning/testing process would have to be undergone in order to obtain reliable rules for a monitoring component M1 corresponding to the new component C1, which is inefficient and time-consuming and might delay the operation of the SOA, because the new component C1 cannot be used productively until a reliable monitoring-rule has been "learned".

On the other hand, the new component C1 may in certain aspects be similar to or almost identical with the existing components $C2, \ldots, Cn$, e.g. two application servers of the same type running on two (nearly) identical computers or two web services that have nearly the same operations. Consequently, rules of the existing monitoring components M2, . . . , Mn might be re-used for the new monitoring component M1 in case the corresponding components are sufficiently similar.

This similarity may be automatically quantified by the present invention based on a similarity-metric (not shown in FIG. 2), which preferably returns a number between 0 and 100 indicating the amount of similarity between two components of the SOA. If the new component C1 to be added to the SOA has a certain required amount of similarity, e.g. 90% or more, with one of the existing components, e.g. with the component C2, it is likely that the validated rules R2 will also be similar to the rules needed to monitor the new component C1, if not identical.

Consequently, adding the already validated rules R2 to a monitoring component M1 of the new component C1 (illustrated by the horizontal arrow in FIG. 2) will save time and efforts and considerably speed up the start of the monitoring process for a changed or extended SOA landscape, since the learning/testing process does not have to be undergone.

The similarity-value is preferably calculated pair-wise for the new component C1 with each of the existing components C2, . . . , Cn and the existing component with the highest similarity value is selected. In order to restrict the comparison of two components to reasonable combinations, only components from the same group may be compared, i.e. only web services or only hardware components of the same type, etc. The similarity-value may be calculated in a number of ways depending on the types of the compared components, for example:

If the components are services (e.g. web services), the similarity-value may be calculated by comparing the number, i.e. the amount, and the names of the operations, i.e. sub-programs, provided by the services and/or by comparing their input and output parameter types, such as integer, string or floating-point number.

If the components are application servers, the similarity-value may be calculated by comparing their product types, product versions and/or their used software (e.g. operating system, runtime environment) or hardware (e.g. available memory).

If the components are computer hardware, the similarity-value may be calculated by comparing their operating systems, operating system versions and/or hardware configurations (e.g. main memory, hard disk space, types of hardware components such as graphic cards or motherboards).

Furthermore, in that preferably only operationally validated rules are re-used for new monitoring components, i.e. rules that already have undergone the full testing-phase, a sufficient quality and robustness of the reused rules is guaranteed.

To further ensure the feasibility of the re-used rules, the new monitoring component M1 may enter the testing-phase in order to test the re-used rule R2 for the monitoring of the component C1. This approach has a considerably improved efficiency compared to the prior art approach, since the costly learning-phase of the learning/testing process can be skipped. If the similarity is sufficiently high, e.g. if two identical computer hardware components are selected, even the testing-phase may be skipped in order to increase the efficiency even more. On the other hand, the learning-phase may in some scenarios still be undergone by the new monitoring component M1, e.g. if the added rules R2 comprise parameters and the concrete parameter values have to be determined for the new monitoring component M1.

The invention claimed is:

1. A method for the rule-based monitoring of a component (C1) added to a service-oriented architecture (SOA), the SOA comprising a plurality of components (C2, . . . , Cn) being monitored by a plurality of monitoring components (M2, . . . , Mn), the method comprising:
  a. selecting a component (C2) from the plurality of components (C2, . . . , Cn) of the SOA which is similar to the added component (C1) based on a similarity-metric;
  b. selecting at least one rule (R2) from the monitoring component (M2) of the selected component (C2), wherein the at least one rule (R2) has already been validated during the operation of the SOA;
  c. adding the at least one rule (R2) to a new monitoring component (M1) of the added component (C1); and
  d. providing the new monitoring component (M1) and the at least one added rule (R2) to a learning-phase to determine at least one parameter of the at least one rule (R2).

2. The method of claim 1, wherein the similarity-metric calculates a similarity-value indicating the similarity of the added component (C1) with the plurality of components (C2, . . . , Cn) of the SOA and wherein the component (C2) with the highest similarity-value is selected.

3. The method of claim 2, wherein the component (C2) is only selected in a if the similarity-value is greater or equal to a pre-defined value.

4. The method of claim 2, wherein the components (C1, C2, . . . , Cn) are services and wherein the similarity-value is calculated based on any of the group of information comprising the number and/or the names of operations provided by the services, their input parameter types and/or their output parameter types.

5. The method of claim 2, wherein the components (C1, C2, . . . , Cn) are application servers and wherein the similarity-value is calculated based on any of the group of information comprising their product types, product versions, used software, and/or used hardware.

6. The method of claim 2, wherein the components (C1, C2, . . . , Cn) are computer hardware and wherein the similarity-value is calculated based on any of the group of information comprising their operating systems, operating system versions and/or hardware configurations.

7. The method of claim 2, wherein the selected monitoring component (M2) has undergone a learning-phase to obtain the at least one rule (R2).

8. The method of claim 1, wherein the similarity-metric categorizes the components (C1, C2, . . . , Cn) into groups such as service, application server and/or computer hardware.

9. The method of claim 1, wherein the selected monitoring component (M2) has undergone a testing-phase to validate the at least one rule (R2) during the operation of the SOA.

10. The method of claim 1, further comprising providing the new monitoring component (M1) and the at least one added rule (R2) to a testing-phase to validate the at least one rule (R2) during the operation of the SOA.

11. A monitoring system for the rule-based monitoring of a component (C1) added to a service-oriented architecture (SOA), the SOA comprising a plurality of components (C2, . . . , Cn) being monitored by a plurality of monitoring components (M2, . . . , Mn), the monitoring system comprising:
  at least one processor in communication with the plurality of monitoring components, the at least one processor being configured to execute instructions to at least:
    a. select a component (C2) from the plurality of components (C2, . . . Cn) of the SOA which is similar to the added component (C1) based on a similarity-metric;

b. select at least one rule (R2) from the monitoring component (M2) of the selected component (C2), wherein the at least one rule (R2) has already been validated during the operation of the SOA;
c. add the at least one rule (R2) to a new monitoring component (M1) of the added component (C1); and
d. provide the new monitoring component (M1) and the at least one added rule (R2) to a learning-phase to determine at least one parameter of the at least one rule (R2).

12. The system of claim 11, wherein the similarity-metric calculates a similarity-value indicating the similarity of the added component (C1) with the plurality of components (C2, ..., Cn) of the SOA and wherein the component (C2) with the highest similarity-value is selected.

13. The system of claim 12, wherein the component (C2) is only selected in (a) if the similarity-value is greater or equal to a pre-defined value.

14. The system of claim 12, wherein the components (C1, C2, ..., Cn) include computer hardware and wherein the similarity-value is calculated based on any of the group of information comprising their operating systems, operating system versions and/or hardware configurations.

15. The system of claim 12, wherein the selected monitoring component (M2) has undergone a learning-phase to obtain the at least one rule (R2) and/or a testing-phase to validate the at least one rule (R2) during the operation of the SOA.

16. The system of claim 11, wherein the similarity-metric categorizes the components (C1, C2, ..., Cn) into groups such as service, application server and/or computer hardware.

17. The system of claim 11, wherein the components (C1, C2, ..., Cn) include services and wherein the similarity-value is calculated based on any of the group of information comprising the number and/or the names of operations provided by the services, their input parameter types and/or their output parameter types.

18. The system of claim 11, wherein the components (C1, C2, ..., Cn) include application servers and wherein the similarity-value is calculated based on any of the group of information comprising their product types, product versions, used software, and/or used hardware.

19. The system of claim 11, wherein the at least one processor is configured to execute further instructions to at least providing the new monitoring component (M1) and the at least one added rule (R2) to a testing-phase to validate the at least one rule (R2) during the operation of the SOA.

20. A non-transitory computer readable storage medium tangibly storing a computer program comprising instructions that, when executed via at least one processor of a monitoring system for the rule-based monitoring of a component (C1) added to a service-oriented architecture (SOA), the SOA comprising a plurality of components (C2, ..., Cn) being monitored by a plurality of monitoring components (M2, ..., Mn), at least:
a. select a component (C2) from the plurality of components (C2, ..., Cn) of the SOA which is similar to the added component (C1) based on a similarity-metric;
b. select at least one rule (R2) from the monitoring component (M2) of the selected component (C2), wherein the at least one rule (R2) has already been validated during the operation of the SOA;
c. add the at least one rule (R2) to a new monitoring component (M1) of the added component (C1); and
d. provide the new monitoring component (M1) and the at least one added rule (R2) to a learning-phase to determine at least one parameter of the at least one rule (R2).

* * * * *